United States Patent
Jung et al.

(10) Patent No.: US 12,204,241 B2
(45) Date of Patent: Jan. 21, 2025

(54) OPTICAL PROXIMITY CORRECTION METHOD AND MASK MANUFACTURING METHOD OF LITHOGRAPHY SYSTEM

(71) Applicant: Samsung Electronics Co., Ltd., Suwon-si (KR)

(72) Inventors: Kangmin Jung, Seoul (KR); Sangwook Park, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 648 days.

(21) Appl. No.: 17/462,401

(22) Filed: Aug. 31, 2021

(65) Prior Publication Data

US 2022/0155674 A1    May 19, 2022

(30) Foreign Application Priority Data

Nov. 18, 2020 (KR) .................. 10-2020-0154393

(51) Int. Cl.
*G03F 1/36*    (2012.01)
*G06F 30/398*    (2020.01)

(52) U.S. Cl.
CPC .............. *G03F 1/36* (2013.01); *G06F 30/398* (2020.01)

(58) Field of Classification Search
CPC ...... G03F 1/36; G03F 7/70441; G06F 30/398; G06F 2111/10
See application file for complete search history.

(56) References Cited

U.S. PATENT DOCUMENTS

| | | | |
|---|---|---|---|
| 7,224,430 B2 | 5/2007 | Dierichs | |
| 8,365,107 B2 | 1/2013 | Tyminski et al. | |
| 9,013,678 B2 | 4/2015 | Chan et al. | |
| 9,717,170 B2 | 7/2017 | Sarto et al. | |
| 9,921,483 B2 | 3/2018 | Dier et al. | |
| 10,036,961 B2* | 7/2018 | Jang | G03F 7/70441 |
| 10,360,339 B2* | 7/2019 | Wang | G03F 7/70441 |
| 2010/0141925 A1* | 6/2010 | Cao | G03F 7/705 355/77 |
| 2016/0026079 A1* | 1/2016 | Kimura | G06F 30/398 716/53 |
| 2016/0077426 A1* | 3/2016 | Jang | G03F 7/70125 430/5 |
| 2019/0163048 A1* | 5/2019 | Choi | G03F 1/36 |
| 2019/0377268 A1 | 12/2019 | Kalden | |
| 2020/0004135 A1 | 1/2020 | Huang et al. | |
| 2021/0264091 A1* | 8/2021 | Stanton | G03F 1/36 |
| 2022/0390832 A1* | 12/2022 | Nath | G03F 7/70441 |

FOREIGN PATENT DOCUMENTS

| | | | |
|---|---|---|---|
| JP | 5383893 B2 | 1/2014 | |
| JP | 6444999 B2 | 12/2018 | |
| KR | 10-2016-0031831 A | 3/2016 | |
| KR | 10-2020-0085883 A | 7/2020 | |

* cited by examiner

*Primary Examiner* — Nha T Nguyen
(74) *Attorney, Agent, or Firm* — Harness, Dickey & Pierce, P.L.C.

(57) ABSTRACT

An optical proximity correction method of a lithography system includes dividing a transmission cross coefficient (TCC) for each slit region; generating an optical proximity correction (OPC) model to which the divided TCC is applied; measuring an apodization value for each slit position; fitting critical dimension (CD) data for each slit position to a simulation CD of the OPC model; and correcting the OPC model using the fitted CD data.

20 Claims, 19 Drawing Sheets

OPTICAL PROXIMITY CORRECTION METHOD AND MASK MANUFACTURING METHOD OF LITHOGRAPHY SYSTEM

CROSS TO REFERENCE TO RELATED APPLICATION(S)

This application claims benefit of priority under 35 U.S.C. § 119 to Korean Patent Application No. 10-2020-0154393 filed on Nov. 18, 2020 in the Korean Intellectual Property Office, the disclosure of which is incorporated herein by reference in its entirety.

BACKGROUND

Example embodiments of the present inventive concepts relate to optical proximity correction methods and mask manufacturing methods of a lithography system.

Generally, patterns of a semiconductor device may be formed by a photolithography process and an etching process. First, a layout for a pattern of a semiconductor device to be formed on a wafer may be designed. When a circuit pattern (hereinafter, referred to as "transfer circuit pattern") is formed on a wafer by transferring a circuit pattern on a mask onto the wafer through a photolithography process, a gap may be formed between the transfer circuit pattern on the wafer and an actual design circuit pattern. This gap may be caused by an optical proximity effect in a photolithography process or a loading effect in an etching process. As a method for accurately transferring a circuit pattern on a mask onto a wafer, a process proximity correction (PPC) technique of performing correction in consideration of deformation of the transfer circuit pattern on the wafer may be used. The process proximity correction technique is to predict in advance and analyze the optical proximity effect and the loading effect and to correct a layout of the circuit pattern on the mask according to a result of the analysis, and generally, an optical proximity correction (hereinafter, OPC) method in a photolithography process may be used. The OPC method may be divided into a model-based OPC and a rule-based OPC. The model-based OPC is a method of correcting a circuit pattern of a mask by applying a single model to overall chips (full-chip) on a wafer. The rule-based OPC is a method of correcting a circuit pattern of a mask by applying a single rule to overall chips on a wafer.

SUMMARY

Some example embodiments of the present inventive concepts provide an optical proximity correction method and a mask manufacturing method of a lithography system which may improve distribution.

Some example embodiments of the present inventive concepts provide an optical proximity correction method and a mask manufacturing method of a lithography system which may improve a yield.

According to some example embodiments of the present inventive concepts, an optical proximity correction method of a lithography system includes dividing a transmission cross coefficient (TCC) for each slit region of a slit; generating an optical proximity correction (OPC) model to which the divided TCC is applied; measuring an apodization value for each slit position; fitting critical dimension (CD) data for each slit position to a simulation CD of the OPC model; and correcting the OPC model using the fitted CD data.

According to some example embodiments of the present inventive concepts, a mask manufacturing method of a lithography system includes measuring critical dimension (CD) data for each slit position from a wafer; determining whether a CD trend for each slit position passes verification; correcting the CD data for each slit position in response to a determination that the CD trend for each slit position fails to pass verification; regenerating an optical proximity correction (OPC) model using the corrected CD data; and determining whether to remanufacture a mask using the regenerated OPC model.

According to some example embodiments of the present inventive concepts, an optical proximity correction method of a lithography system includes generating an optical proximity correction (OPC) model; calibrating the generated OPC model; performing a first verification using an OPC verification model; fitting CD data for each slit position in response to a determination that the first verification fails; and performing a second verification using the OPC verification model in response to performing the fitting CD data.

A computing system for performing optical proximity correction includes at least one memory for storing at least one instruction; and at least one processor configured to execute the at least one instruction to divide a transmission cross coefficient (TCC) for each slit region of a slit, to generate an optical proximity correction (OPC) model reflected with the divided TCC, to measure an apodization value for each slit position, to fit critical dimension (CD) data for each slit position to a simulation CD of the OPC model; and to execute the at least one instruction to correct the OPC model using the fitted CD data.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Hereinafter, example embodiments of the present inventive concepts will be described as follows with reference to the accompanying drawings.

Figure 1:
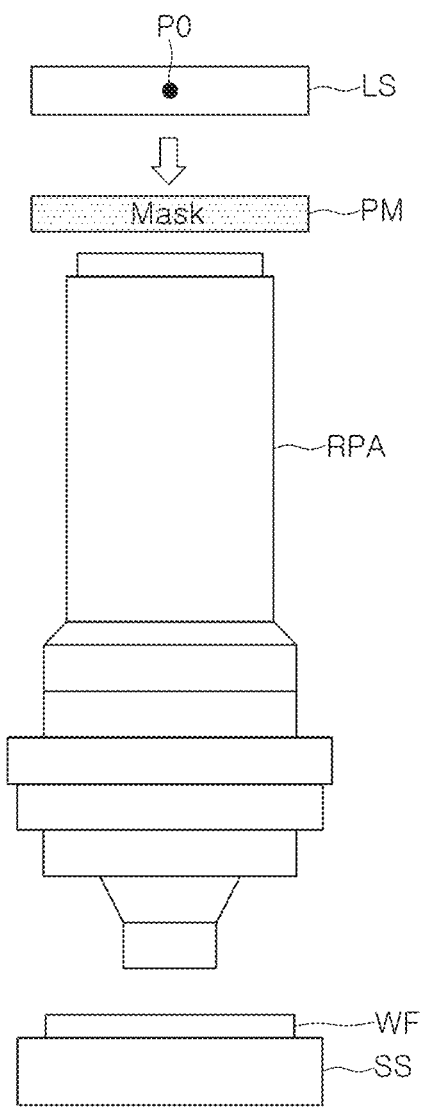
FIG. 1 is a diagram illustrating a lithography system 10 according to some example embodiments of the present inventive concepts.

FIG. 1 is a diagram illustrating a lithography system 10 according to some example embodiments. Referring to FIG. 1, the lithography system 10 may include a light source LS, a photomask PM, a reduction projection apparatus RPA, and a substrate stage SS. The lithography system 10 may further include elements not illustrated in FIG. 1. For example, the lithography system 10 may further include a sensor used to measure a height and inclination of a surface of a substrate WF.

The light source LS may be implemented to emit light. The light emitted from the light source LS may be irradiated to the photomask PM. For example, to adjust a focus of light, a lens may be provided between the light source LS and the photomask PM. The light source LS may include an ultraviolet light source (e.g., a KrF light source having a wavelength of 234 nm, an ArF light source having a wavelength of 293 nm, or the like). In some example embodiments, the light source LS may include a point light source PO. However, some example embodiments thereof are not limited thereto. In some example embodiments, the light source LS may include a plurality of point light sources.

To print (implement) a designed layout on the substrate WF, the photomask PM may include mask patterns. The mask patterns may block light PO emitted from the light source LS. An area in which the mask patterns are not formed may pass light emitted from the light source LS.

The reduction projection apparatus RPA may be implemented to receive light having passed through the photomask PM. The reduction projection apparatus RPA may match layout patterns to be printed on the substrate WF with mask patterns of the photomask PM. Further, the reduction projection apparatus RPA may include an aperture. The aperture may be used to increase a depth of a focus of ultraviolet light emitted from the light source LS. For example, the aperture may include a dipole aperture or a quadruple aperture. The reduction projection apparatus RPA may further include a lens to adjust a focus of light.

Light having passed through the photomask PM may be irradiated to the substrate WF through the reduction projection device RPA. Accordingly, resist patterns corresponding to the mask patterns of the photomask PM may be printed on the substrate WF.

The substrate stage SS may support the substrate WF. For example, the substrate WF may include a silicon wafer.

Generally, a difference in critical dimensions (CD) may be generated in the same pattern according to a slit position due to a shadowing effect of extreme ultra-violet (EUV). A general lithography system may predict CD for each slit by an EUV optical proximity correction (OPC) model, but may have a limitation in actual predictive power.

However, the lithography system 10 in some example embodiments may include an EUV OPC model which may directly correct intensity according to a slit position through an apodization value implemented in the form of a table of intensity values, thereby improving CD predictive power for each slit position of the OPC model. Accordingly, the lithography system 10 in some example embodiments may improve EUV OPC distribution.

Figure 2A:
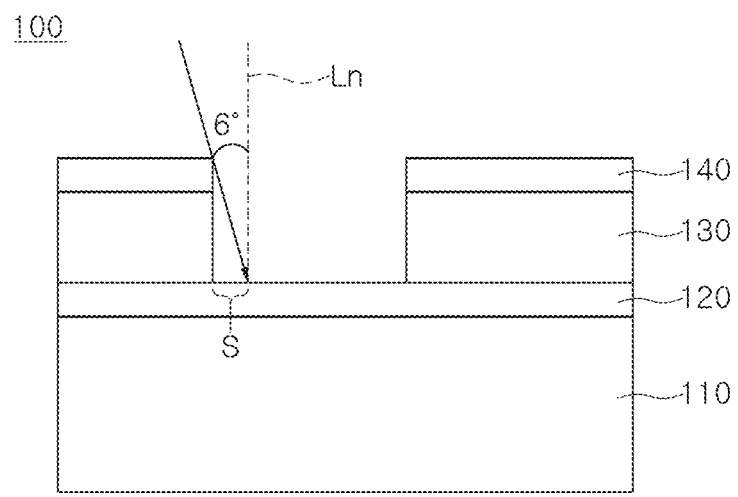
FIGS. 2A, 2B, and 2C are diagrams illustrating slits of a photomask (PM) according to some example embodiments of the present inventive concepts.
Figure 2B:
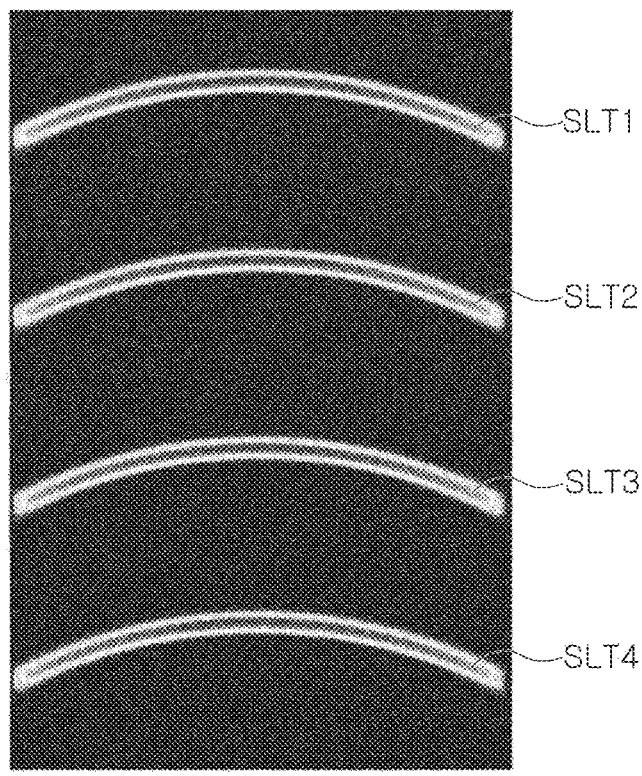
Figure 2C:
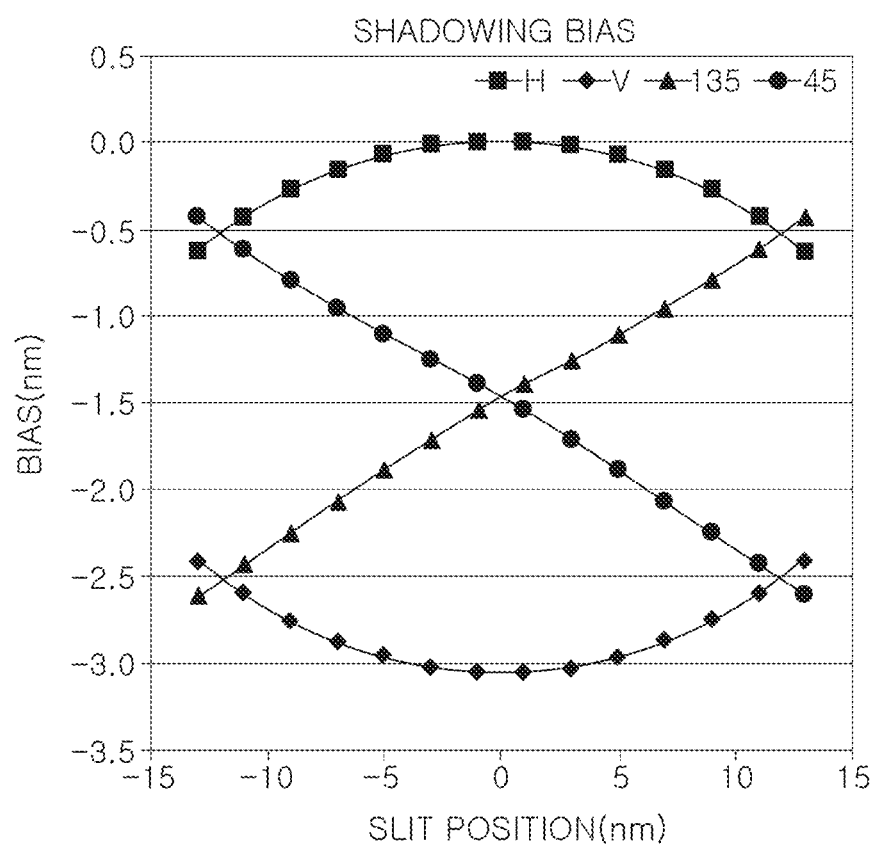

FIGS. 2A, 2B, and 2C are diagrams illustrating slits of a photomask (PM) according to some example embodiments.

Referring to FIG. 2A, a port mask PM (100) may include a reflective layer 110, a capping layer 120, an absorption layer 130, and an anti-reflective coating (ARC) layer 140.

The reflective layer 110 may have a function of reflecting incident light. As illustrated, the absorption layer 130 may be formed on the reflective layer 110. The reflective layer 110 may be exposed from the absorption layer 130. Light incident to the exposed reflective layer 110 may be reflected by the reflective layer 110. For example, the reflective layer 110 may be formed in a multilayer structure in which 30 to 60 Mo/Si layers are alternately stacked. A substrate may be disposed below the reflective layer 110. For example, the substrate may be a glass substrate or a quartz substrate.

The capping layer 120 may be formed on an upper surface of the reflective layer 110 to protect the reflective layer 110. For example, the capping layer 120 may be formed of ruthenium oxide (RuO). A material of the capping layer 120 is not limited to RuO. In some example embodiments, the capping layer 120 may not be provided.

The absorption layer 130 may be formed of an inorganic material or a metal, opaque to light. For example, the absorption layer 130 may be formed of a tantalum (Ta)-based compound, TaN, TaBN, TaBON, or the like. Some example embodiments thereof are not limited thereto. The absorption layer 130 may also be formed of other metals such as Al, Cr, W, or the like.

The ARC layer 140 may be formed on the absorption layer 130. The ARC layer 140 may be configured to prevent reflection of incident light. For example, the ARC layer 140 may be formed of silicon nitride (SiN), silicon oxide (SiO), silicon oxynitride (SiON), molybdenum silicon nitride (MoSiN), molybdenum silicon oxide (MoSiO), molybdenum silicon oxynitride (MoSiON), titanium nitride (TiN), or the like. Also, the ARC layer 140 may be formed of an amorphous carbon film, an organic ARC, an inorganic ARC, or the like.

As described above, in an EUV exposure process, light may be incident at an angle of 6° with respect to a normal line Ln, indicated by an arrow. Since light is incident at 6° with respect to the normal line Ln, movement or displacement (S) of an image may occur by a thickness of a pattern, a thickness of the reflective layer 110 and the ARC layer 140, which may cause a shadowing effect.

FIG. 2B illustrates an example of a plurality of slits formed in a photomask PM. As illustrated in FIG. 2B, the plurality of slits SLT1 to SLT4 (e.g., SLT1, SLT2, SLT3, and SLT4) may be disposed with a particular (or, alternatively, predetermined) distance therebetween. Each of the slits SLT1 to SLT4 may be a unit which may uniformly irradiate light to an extreme ultraviolet (EUV) mask as a device for performing EUV exposure process removes light. In some example embodiments, each of the plurality of slits SLT1 to SLT2 may be implemented in an arc shape.

FIG. 2C illustrates a shadowing bias according to a position of each slit.

Generally, in an EUV OPC, a difference in CD may occur depending on a position of the slit in a slot even in the same pattern by a shadowing effect (since non-telecentric illumination is incident to a curved slit, a difference in CD may occur depending on a position of the slit). Accordingly, distribution may be deteriorated in terms of in-field-uniformity. A general OPC model may perform CD predictive power for each slit by adding CD data for each slit when model calibration is performed. A general OPC model may perform calibration on the CD data including the CD data for each slit with reference to a slit center. However, tendency of the CD for each slit of the CD data applied to the OPC model generation may be different from tendency of the CD for each slit of the CD data in performing an actual process. Also, a coverage of the OPC model may not be satisfied due to the phenomenon in which a trend is different from an actual theory.

In the OPC method in some example embodiments, a model for predicting CD data may be preferentially generated with reference to the slit center, and an apodization table listing an intensity for each position of the slit, which may actually occur in a wafer, may be applied to the OPC model. Thereafter, the OPC method in some example embodiments may correct the intensity for each slit position through a corresponding apodization table.

Figure 3:
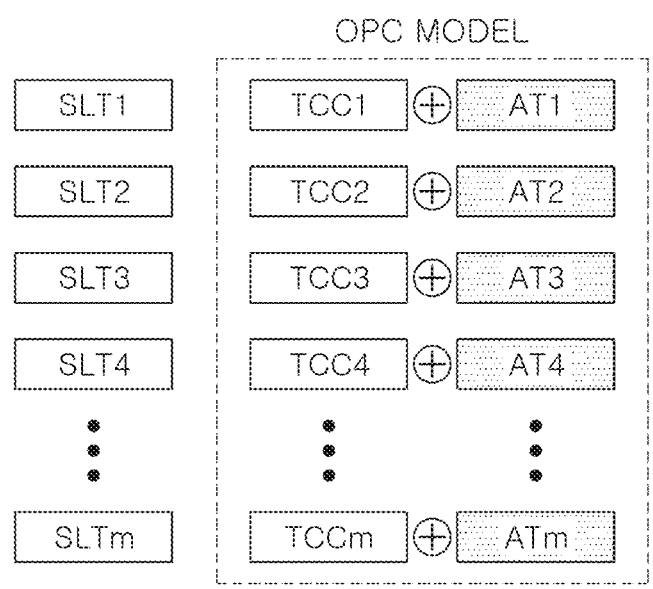
FIG. 3 is a diagram illustrating a process of generating an OPC model according to some example embodiments of the present inventive concepts.

FIG. 3 is a diagram illustrating a process of forming an OPC model according to some example embodiments. Referring to FIG. 3, as for the slits SLT1 to SLTm (m is an integer of 2 or greater), the OPC model may be manufactured using corresponding TCCs TCC1 to TCCm and corresponding apodization tables AT1 to ATm.

In some example embodiments, the TCC may be a transmission function for calculating kernels used in an optical proximity correction (OPC) method. The TCC may include information on a light source and a pupil.

The apodization table AT1 to ATm may include apodization values according to positions of the slit. In some example embodiments, the apodization value may be measured for each slit position depending on facility. In some example embodiments, the apodization value may be a value of a trend graph using a value measured for each slit position. Accordingly, the apodization values at the apodization table AT1 to ATm may be measured based on measuring a particular apodization value of a light source for each slit position of the plurality of slits.

Generally, as a pattern becomes finer, an optical proximity effect (OPE) caused by an influence between adjacent patterns may occur in an exposure process. The OPC method may prevent OPE by correcting a pattern layout on a mask to which a pattern is transferred.

Figure 4:
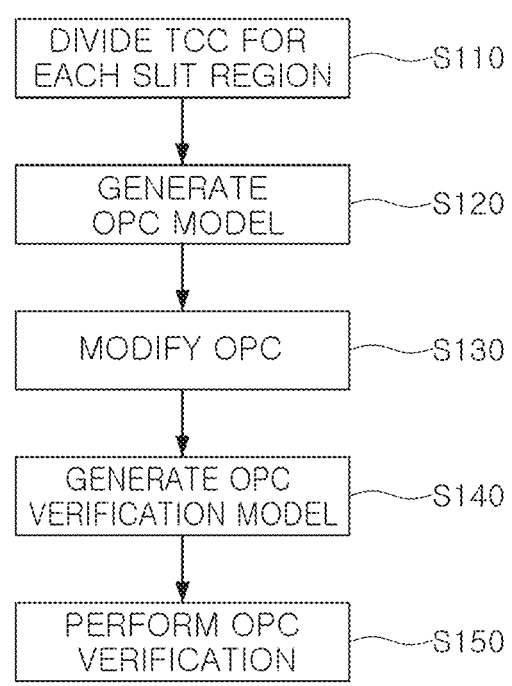
FIG. 4 is a flowchart illustrating an OPC method according to some example embodiments of the present inventive concepts.

FIG. 4 is a flowchart illustrating an OPC method according to some example embodiments. An OPC method may include a method of correcting a pattern layout on a mask used in an EUV exposure process.

Referring to FIG. 4, a transmission cross coefficient (TCC) may be divided for each region (e.g., slit region) of a slit (S110). Since the EUV exposure process uses a wavelength of less than 22 nm, a short wavelength of 13.5 nm, for example, a diffraction phenomenon may not be significant. Accordingly, as compared to the OPC in a general DUV exposure process using 193 nm, a specific gravity of OPC for the diffraction phenomenon may not be significant. The EUV exposure process may cause a flare effect due to defects such as a mirror or a shadowing effect caused by a thickness of a mask pattern. An OPC method reflecting the flare effect or the shadowing effect may be necessary.

Generally, the flare effect may be caused by scattering depending on surface roughness of a mirror. The flare effect may be more prominent in short-wavelength EUV because the scattering is inversely proportional to the square of the wavelength. Also, the shadowing effect may be caused by a phenomenon in which, as illustrated in FIG. 2A, an image moves as light is incident to a mask at an angle of 6° from a normal line and the pattern of the mask has a thickness.

In the EUV exposure process, the following issues may be caused in relation to light incident at 6° from the normal line. For example, in the DUV exposure process, the slit may have a rectangular structure, but the slit in the EUV exposure process may have a circular arc structure (e.g., may be implemented in an arc shape) having a particular (or, alternatively, predetermined) curvature. The light incident at 6° from the normal line may pass through the curved slit of the arc structure, and an azimuth angle thereof may be varied depending on a position of the slit. Accordingly, intensity and phases of the light passing through the slit may be varied depending on the position of the slit. The generation of the CD according to the position of the slit may cause an error of the TCC, and accordingly, an error of the OPC method or the OPC model may occur.

Generally, since the slit used in the DUV exposure process has a linear structure of a rectangular shape, there may be no change in the azimuth angle of light passing through the slit, and aberration depending on the position of the slit may rarely occur. Therefore, there may be no issue even when the OPC is performed by calculating only the TCC of a central region of the slit and reflecting the same TCC to the entire region. However, in the EUV exposure process, since a curved slit having an arc structure is used, the TCC may be varied depending on positions of the slit. If the OPC method is performed through the TCC calculation of only the central region of the slit as in the general DUV exposure process, an accurate OPC model may not be generated. Such an inaccurate OPC model may cause a pattern defect of the EUV mask and a plurality of defective chips, which may lower a yield of the entire semiconductor process.

In the EUV exposure process, when the OPC is performed using the TCC only in the central portion despite the curved slit shape, errors may occur in patterns of the EUV mask of a portion corresponding to an edge of the slit and chips corresponding thereto. An error caused by the structure of the slit may be called a slit error or a scanner error. Accordingly, in the OPC method, the TCC may be calculated by dividing the TCC for each region of the slit, rather than calculating the TCC in the center of the slit.

A profile of the mask pattern may be determined by a contour of a profile function. The profile function may be expressed by convolutional integration of image intensity and Gaussian function. Accordingly, by calculating the image intensity by calculating kernels of the TCC, an OPC model for the mask pattern profile may be generated. The dividing the TCC may include calculating the TCC for each region by dividing the slit for each region. In some example embodiments, the TCC may be divided using at least one of an aberration, a phase, an intensity, a polarity, or an apodization value (e.g., separate apodization value) according to coordinates of the slit.

After the TCC is divided for each region of the slit, the OPC model to which the divided TCC may be applied may be generated by reflecting the divided TCC (S120). By reflecting the TCC of each region of the slit to each region of the slit, OPC models for each region (e.g., slit region) of the slit may be generated. Since the CD is present depending on the position of the slit, the TCC for each region of the slit may be varied. Accordingly, the OPC models of each region of the slit may also be varied.

After generating the OPC model, the OPC may be modified (e.g., corrected) (S130). In some example embodiments, after generating an OPC model reflecting each TCC, a pattern of a mask may be obtained through simulation based on the OPC model, and it may be determined whether the obtained mask pattern matches a target mask pattern. When there is a difference therebetween, the OPC may be modified for the mask pattern to match the target mask pattern. For example, the target mask pattern may have a square shape, and the OPC model may have a square shape, but the mask pattern obtained through simulation may have a circular shape. A modification in which a shape may be added to each corner of the square OPC model may be performed. The OPC modification may be to modify a program to obtain a required model form by reflecting overall parameters such as OPC recipe, model calibration, and horizontal and vertical bias, rather than simply modifying a model form.

Also, in some example embodiments, OPC correction corresponding to each of the slits SLT1 to SLTm may be performed using the apodization tables AT1 to ATm.

After modifying the OPC, an OPC verification model may be generated (S140). The OPC verification model may be a result of modifying the OPC. After generating the OPC verification model, the OPC verification may be performed (S150). In the OPC verification, simulation may be performed based on the OPC verification model. The OPC verification may include a process of checking whether the mask pattern obtained through the simulation matches the target mask pattern.

Generally, OPC verification refers to verification of whether the OPC modification has been properly performed through a simulation contour of a pattern. For example, when the simulation contour through the OPC verification model is within an error tolerance, the OPC method may be terminated and a mask tape-out (MTO) process may be performed. When the simulation contour through OPC verification is beyond an error acceptance range, the OPC may be remodified through modification of parameters such as model adjustment, OPC recipe, and bias, and the OPC verification model may be generated and the OPC verification may be performed again. Also, the MOT may include a request to manufacture a mask by providing a mask design data on which the OPC method has been completed. Therefore, the mask design data on which the OPC method has been completed may be referred to as MTO design data.

The OPC method according to some example embodiments, including the method shown in FIG. 4, may include dividing the TCC for each region of the slit, generating an OPC model by reflecting the divided TCC, and correcting the OPC model according to the apodization value, thereby manufacturing an EUV mask which may correct a pattern error of a portion corresponding to a slit edge according to a slit effect. Also, by performing the exposure process through the EUV mask, defects of chips in a portion corresponding to the slit edge may be prevented. In some example embodiments, distribution in the EUV exposure process may improve, and a yield may improve.

FIGS. 5A, 5B, 5C, and 5D are diagrams illustrating a process of processing an apodization value for each position of slits.

Figure 5A:
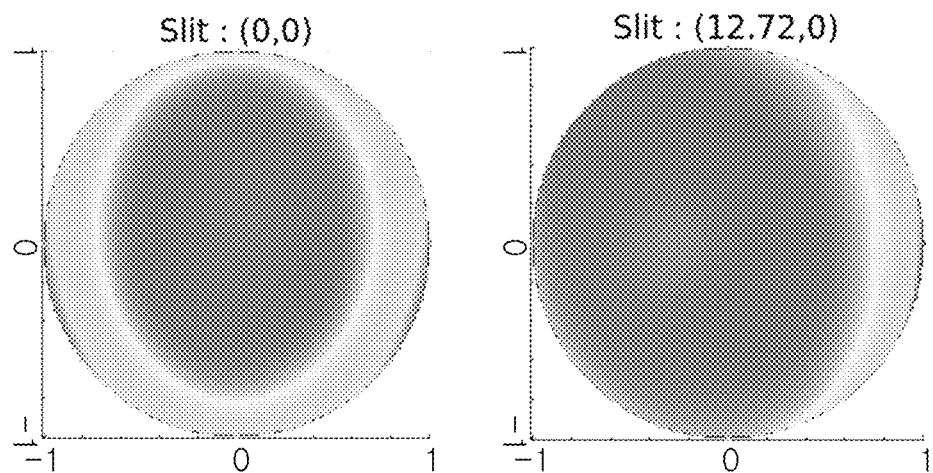
FIGS. 5A, 5B, 5C, and 5D are diagrams illustrating a process of processing an apodization value for each position of slits.
Figure 5B:
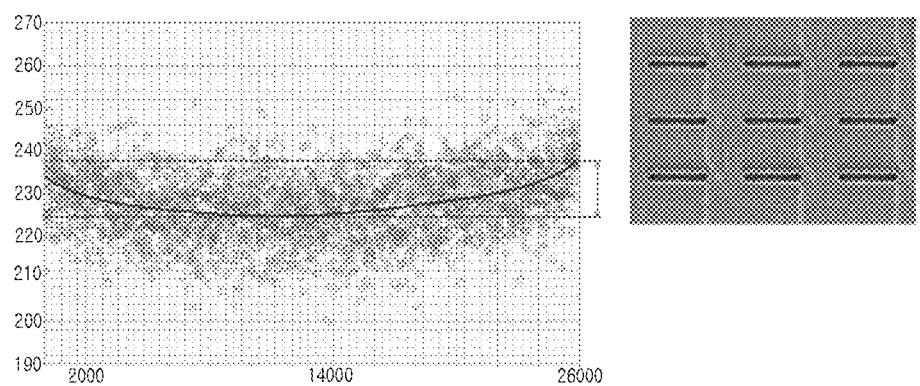

Referring to FIG. 5A, an apodization value (e.g., an apodization value of a light source) for each slit position of a plurality of slits may be measured. Referring to FIG. 5B, a trend function may be extracted from large-capacity critical dimension (CD) measurement data. In some example embodiments, the extracted trend function may include a quadratic function.

Figure 5C:
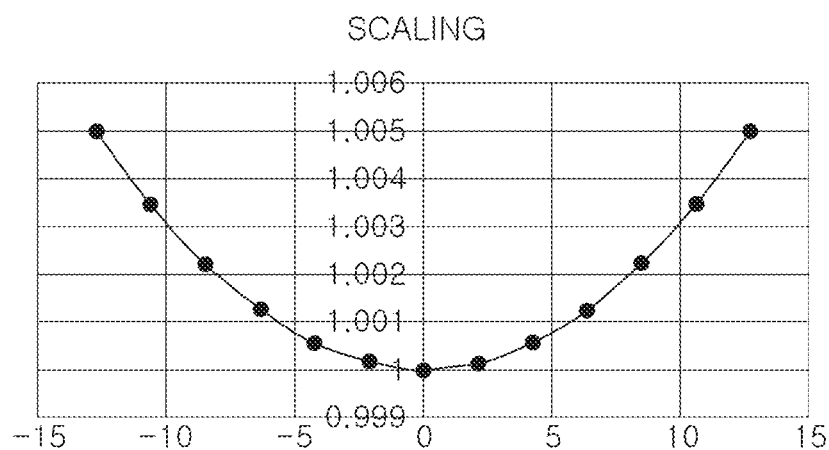

Referring to FIG. 5C, the apodization value for each slit position may be scaled in a two-dimensional function to CD data for each slit position to a simulation CD of the OP model.

Figure 5D:
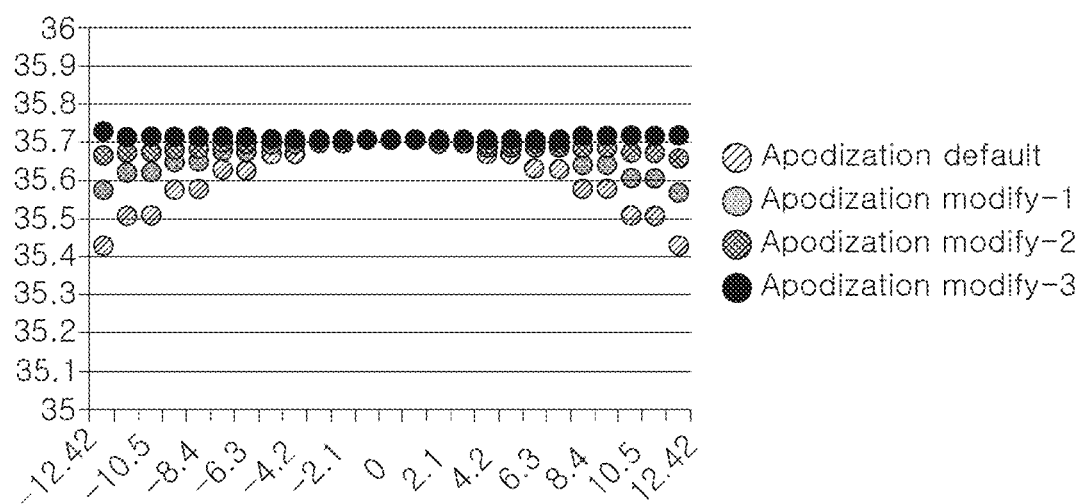

Referring to FIG. 5D, a simulation CD value (e.g., simulation CD data) according to a change in apodization value for each slit position may be confirmed (e.g., checked). An apodization value having the same trend value as that of the measured wafer result (e.g., a measured CD data of a wafer) may be selected to fit critical dimension (CD) data for each slit position to a simulation CD of the OPC model.

A general EUV OPC model may require CD data at a slit center position for predictive power in a short range and CD data for each slit position for predictive power in a long range of a shot level. As for the generated model, it is necessary to predict the CD in a center of the slit and also a change of the CD depending on a position of the slit. However, in reality, while the predictive power of the model may be high in the slit center, the CD predictive power depending on the slit position may be low for various reasons such as a process and facility, which may deteriorate distribution of a wafer.

In the OPC model in some example embodiments, a method for additionally correcting the CD for each slit position may be added in the OPC model generated preferentially. A table value representing the apodization phenomenon in which intensity of the outer region of a source decreases due to a difference in transmittance of the projection lens may be expressed in the form of an array of intensity values (e.g., intensity values of apodization) for each slit position. The intensity value of the table corresponding to EUV may be measured for each slit position. Generally, the slit region may be divided into 13 slit regions. Restated a number of slit positions of each slit of a plurality of slits may be 13. By individually correcting the measured intensity values of apodization in each slit position, the CD data for each slit position measured on an actual wafer may be additionally fitted (e.g., the CD data may be fitted as described herein while the intensity value of apodization is corrected for each slit position).

Figure 6:
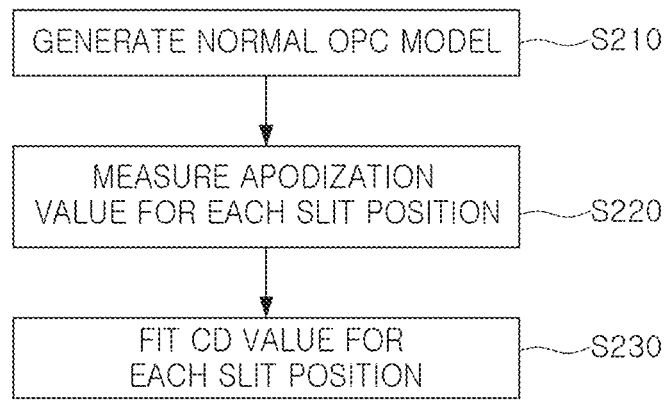
FIG. 6 is a flowchart illustrating a method of correcting an OPC model according to some example embodiments of the present inventive concepts.

FIG. 6 is a flowchart illustrating a method of correcting an OPC model according to some example embodiments. Referring to FIG. 6, the OPC model correction method may be performed as below. Said OPC model correction as described with reference to FIG. 6 may be performed as part of generating and modifying an OPC model at S120 and S130 as described above with reference to FIG. 4.

It will be understood that any of the operations in any of the methods as described herein may be included in any combination with any other operations of any of the methods according to any of the example embodiments and in any order.

A general EUV OPC model, to which a divided TCC may be applied, may be generated. In this case, CD data of the same pattern may be obtained for each slit position of the slit (S210), which may correspond to S120 at FIG. 4. The apodization of the real source may be measured at the pupil plane of facility. For example, the apodization value may be measured for each of 23 slit positions of a slit (S220). The intensity value of the apodization table may be corrected such that the actual measured wafer CD value for each slit position may be fitted to the simulation CD of the pre-manufactured (e.g., original) OPC model (S230). Restated, the measured CD data for each slit position and simulation CD data of the OPC model may be fitted by correcting an intensity value of an apodization table in order to fit critical dimension (CD) data for each slit position to a simulation CD of the OP model. The generated OPC model may then be corrected using the fitted CD data.

As described above, the generated OPC model may precisely correct the CD trend for each slit position occurring in the wafer.

Also, when the CD trend for each slit position used when the OPC model is generated is different from that of the real wafer, additional correction may be difficult in the general OPC model generation method, whereas in some example embodiments, the general OPC model may be maintained, and only the intensity depending on the slit position may be corrected, thereby correcting the CD change for each slit position and improving the wafer distribution.

Figure 7:
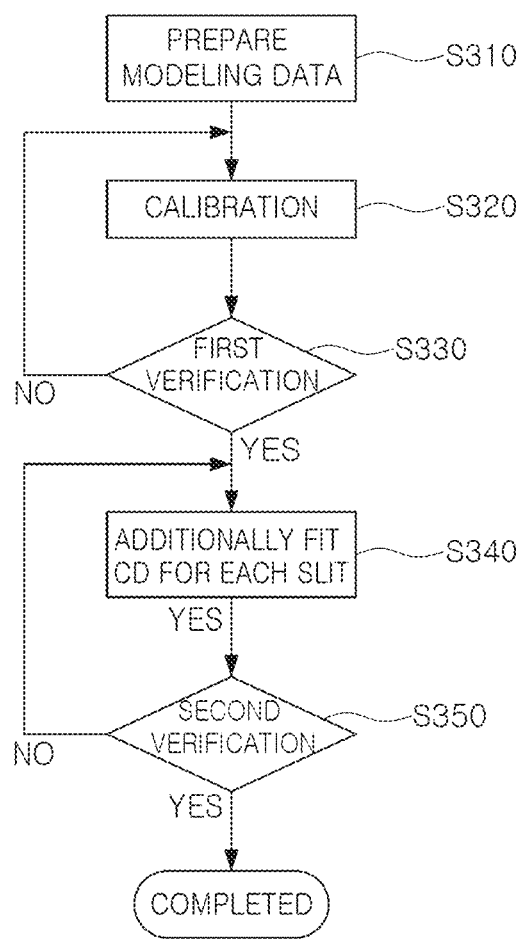
FIG. 7 is a flowchart illustrating a process of generating an OPC model according to some example embodiments of the present inventive concepts.

FIG. 7 is a flowchart illustrating a process of generating an OPC model according to some example embodiments. Referring to FIG. 7, the OPC model generation process may be performed as below.

Data for OPC modeling may be prepared (S310). An OPC model may be generated as part of the preparing at S310. Thereafter, calibration for the OPC model (e.g., calibrating the generated OPC model) may be performed using the TCC (S320). Thereafter, a first OPC verification operation (e.g., performing a first verification of the generated OPC model using an OPC verification model) may be performed (S330). Thereafter, additional CD fitting for each slit may be performed (S340). For example, fitting CD data for each slit position in may be performed at S340 in response to a determination that the first verification at S330 fails. Thereafter (e.g., in response to performing the fitting at S340), a second OPC verification operation (e.g., performing a second verification of the generated OPC model using the OPC verification model) may be performed (S350). In some example embodiments, the method shown in FIG. 7 may further include measuring apodization values for each slit position with respect to a wafer as described herein. In some example embodiments, the method shown in FIG. 7 may further include generating a trend function in a form of a quadratic function using the measured apodization values as described herein. In some example embodiments, the method shown in FIG. 7 may further include scaling the apodization values for each slit position with a two-dimensional function as described herein. In some example embodiments, the method shown in FIG. 7 may further include CD-scaling for each slit position to establish scaled simulation CD data; and fitting the scaled simulation CD data to CD data of a wafer as described herein.

Figure 8:
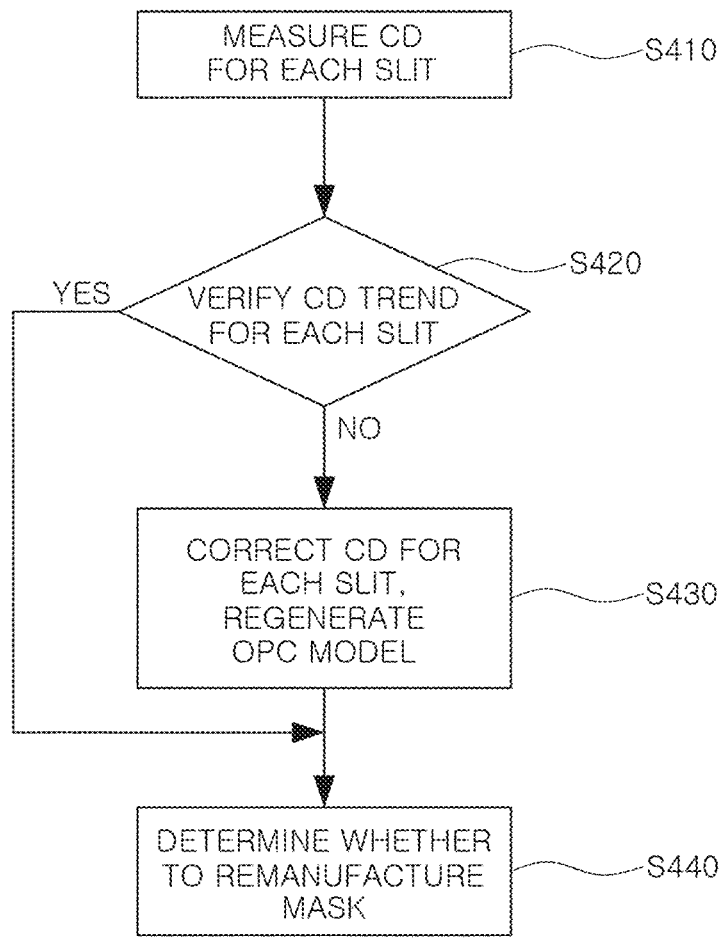
FIG. 8 is a flowchart illustrating a method of determining whether to remanufacture a wafer according to some example embodiments of the present inventive concepts.

FIG. 8 is a flowchart illustrating a method of determining whether to remanufacture a wafer according to some example embodiments. Referring to FIG. 8, a method of determining whether to remanufacture a wafer may be performed as below.

A CD (e.g., CD data) for each slit (e.g., each slit position from a wafer) may be measured (S410). It may be determined whether a CD trend verification for each slit has passed (e.g., whether a CD trend for each slit position passes verification) (S420). If not, CD correction for each slit may be performed, and an OPC model may be regenerated (S430). Restated, at S430 the CD data for each slit position may be corrected in response to a determination that the CD trend for each slit position fails to pass verification, and an optical proximity correction (OPC) model may be regenerated using the corrected CD data. Thereafter, it may be determined whether to remanufacture a mask (e.g., using the regenerated OPC model) (S440).

FIGS. 9A, 9B, 9C, and 9D are diagrams illustrating improvement of distribution through CD correction for each slit.

Figure 9A:
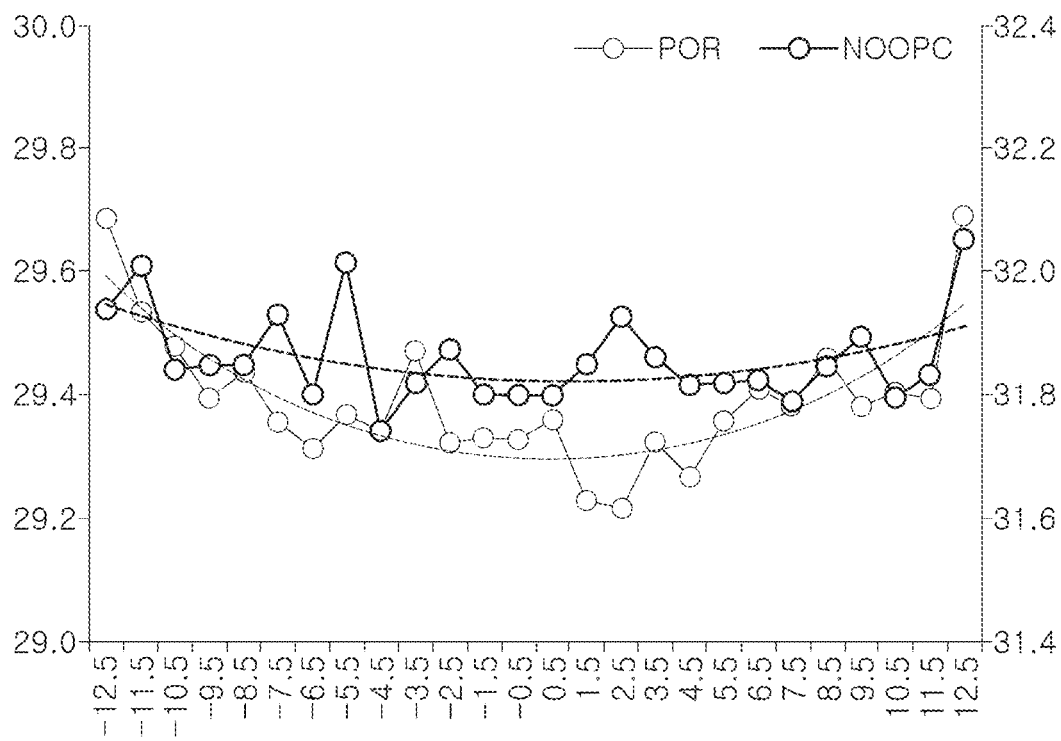
FIGS. 9A, 9B, 9C, and 9D are diagrams illustrating improvement of distribution through CD correction for each slit.
Figure 9B:
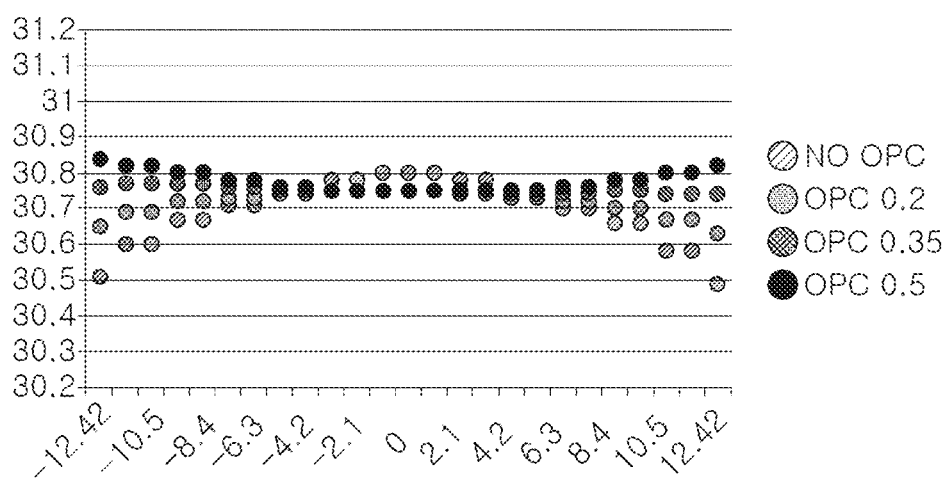
Figure 9C:
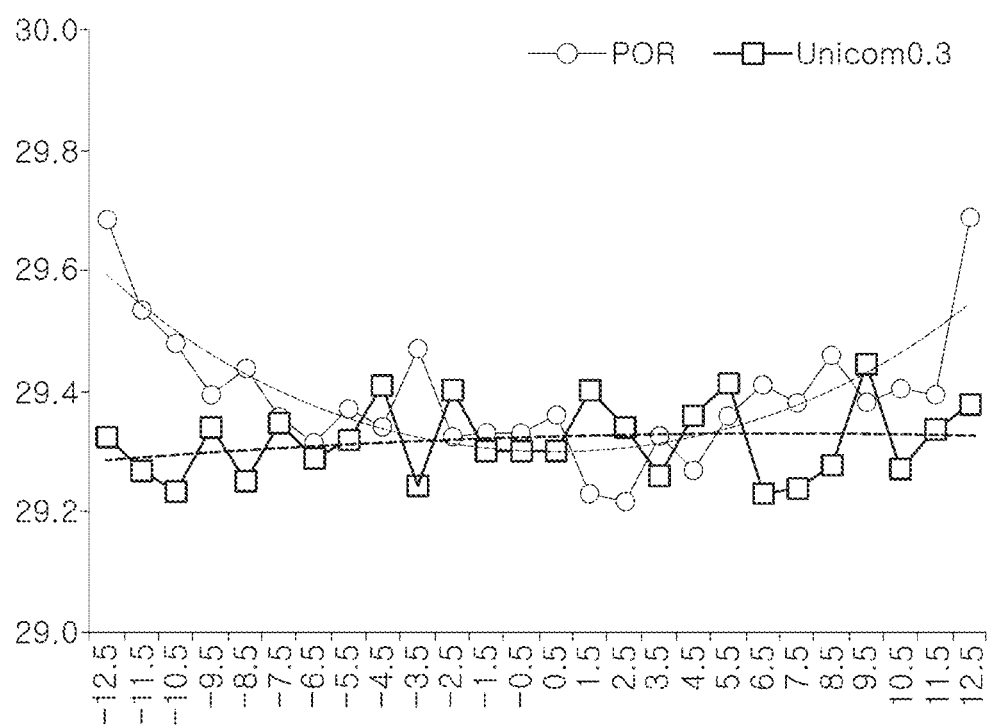
Figure 9D:
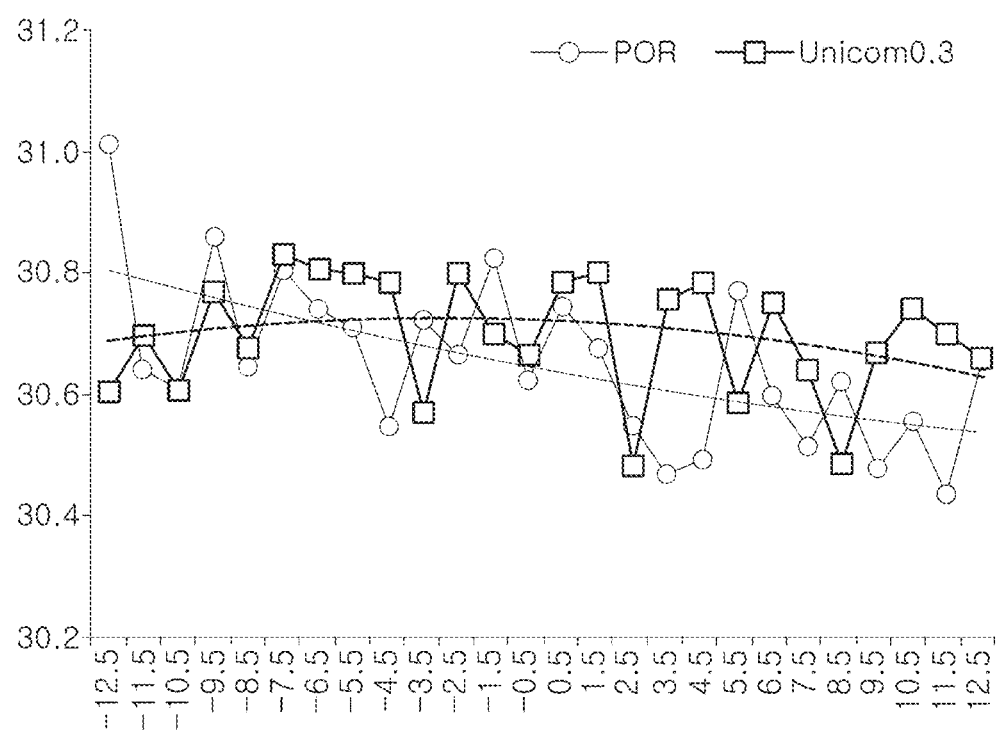

Referring to FIG. 9A, an OPC negative confirmation (e.g., S420=NO) may occur for each slit position. Referring to FIG. 9B, in addition to the operations shown in FIG. 8, additional correction may be performed by CD scaling for each slit position (e.g., before or after performing S430 in response to S420=NO). Said scaling may include performing scaling in a form of a quadratic function from the measured CD data. Fitting of the simulation CD and the wafer CD by scaling may be performed. Referring to FIGS. 9C and 9D, distribution may improve by CD correction for each slit position.

In some example embodiments, the method shown in FIG. 8 may further include checking a simulation CD value (e.g., simulation CD data) according to a change in apodization value for each slit position. In some example embodiments, the method shown in FIG. 8 may further include selecting an apodization value having the same trend value as that of the measured wafer result (e.g., a measured CD data of a wafer) as a result of checking the simulation CD data. In some example embodiments, in the method shown in FIG. 8, an intensity value of apodization for each slit position may be implemented in a form of a table as described herein.

In some example embodiments above, the OPC method related to the EUV exposure process has been described. In other words, the TCC division for each region of the curved slit used in the EUV exposure process has been described. However, the OPC method of some example embodiments does not entirely exclude TCC division for each region of a linear slit. For example, when a mask used for DUV is manufactured, the OPC method by dividing the TCC for each region of the slit of some example embodiments may be applied. Even for the linear slit, by reflecting the TCC division for each region of the slit, a more reliable OPC method may be performed.

Figure 10A:
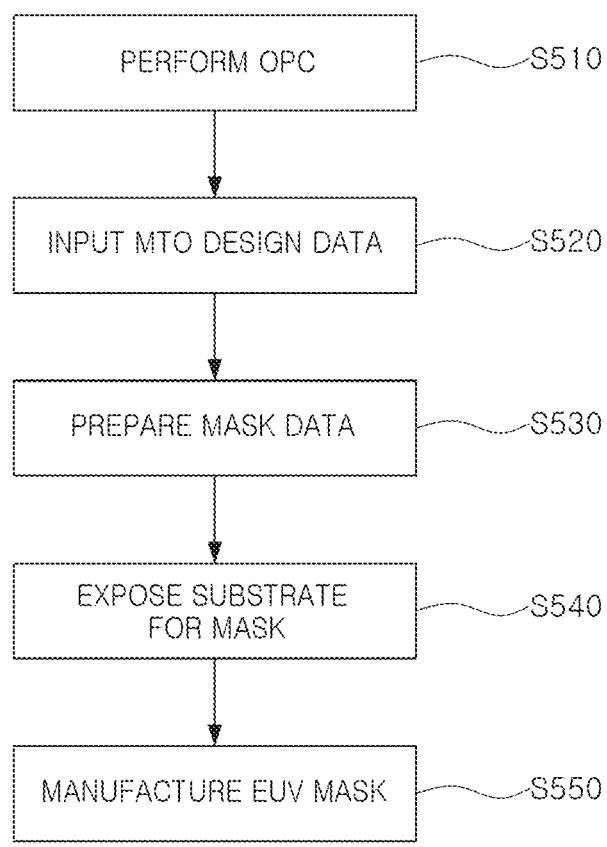
FIGS. 10A and 10B are flowcharts illustrating processes of a method of manufacturing an EUV mask according to some example embodiments of the present inventive concepts.
Figure 10B:
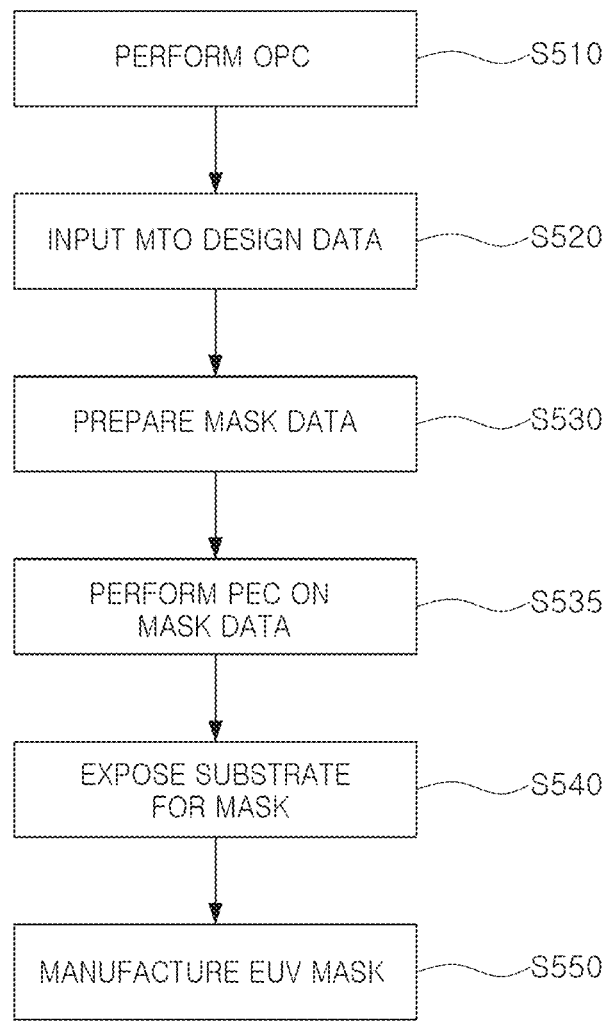

FIGS. 10A and 10B are flowcharts illustrating processes of a method of manufacturing an EUV mask according to some example embodiments.

Referring to FIG. 10A, an OPC may be performed (S510). The OPC may include a series of processes of dividing the TCC for each slit region, generating an OPC model by reflecting the TCC, modifying the OPC based on an apodization table and an OPC model, and generating an OPC verification model for OPC verification.

After the OPC is performed, MTO design data may be input (S520). Generally, the MTO may include a request to manufacture a mask by providing a mask design data on which the OPC process has been completed. Therefore, the MTO design data may be considered as mask design data on which the OPC process has been completed. Such MTO design data may have a graphic data format used in electronic design automation (EDA) software. For example, the MTO design data may have a data format such as graphic data system II (GDS2) and open artwork system interchange standard (OASIS).

After receiving the MTO design data, mask data preparation (MDP) may be performed (S530). The mask data preparation may include, for example, format conversion called fracturing, a barcode for mechanical reading, augmentation of standard mask patterns for inspection, job decks, and automatic and manual verification. The job-deck may include creating a text file relating to a series of commands such as arrangement information of multiple mask files, a reference dose, and an exposure speed or method. The format conversion, fracturing, may include a process of dividing the MTO design data for each region and changing the data to have a format for electron beam exposure.

The fracturing may include data manipulation such as scaling, data sizing, data rotation, pattern reflection, and color inversion. In the process of conversion through fracturing, data for many systematic errors which may occur somewhere in the process of transferring from design data to an image on a wafer may be corrected. A data correction process for the systematic errors may be known as mask process correction (MPC), and may include, for example, a line width adjustment called CD adjustment and a task of increasing pattern placement accuracy. Therefore, the fracturing may contribute to quality improvement of a final mask, and may also be previously performed to correct the mask process. The systematic errors may be caused by distortion occurring in an exposure process, a mask development and etching process, and a wafer imaging process.

The preparation of mask data may include the aforementioned MPC. The MPC may refer to a process of correcting errors which may occur during the exposure process, which may be systematic errors. The exposure process may include electron beam writing, development, etching, and baking. Also, data processing may be performed prior to the exposure process. The data processing may be pre-processing for mask data, and may include a grammar check for mask data, exposure time prediction, and the like.

After preparing the mask data, the mask substrate may be exposed based on the mask data (S540). Exposure may include, for example, writing an electron beam. The electron beam writing may be performed by a gray writing method using a multi-beam mask writer (MBMW), for example. Also, the electron beam writing may be performed using a variable shape beam (VSB) exposure device.

After the mask data preparation process, a process of converting the mask data into pixel data may be performed before the exposure process. The pixel data may be directly used for actual exposure, and may include data on a shape to be exposed and data on a dose assigned to each piece of data. The shape data may be bit-map data in which shape data, vector data, is converted through rasterization.

After the exposure process, a series of processes may be performed to form a mask (S550). The series of processes may include development, etching, and cleaning, for example. Also, the series of processes for forming a mask may include a measurement process, a defect inspection process or a defect repair process. Also, a pellicle application process may be included. The pellicle application process may include a process of attaching a pellicle to protect the mask from subsequent contamination during the delivery of the mask and a use-lifespan of the mask when it is confirmed through final cleaning and inspection that there are no contaminants or chemical stains.

The method of manufacturing an EUV mask in some example embodiments may include reflecting the TCC division for each region of the slit, and performing OPC correction using an apodization table as described above, thereby preventing an error in a region corresponding to a slit edge caused by slit phenomenon. Also, as the exposure process is performed using the EUV mask, defects in a region corresponding to the slit edge may be prevented, thereby preventing defects in chips in the corresponding portion, and improving a semiconductor process yield and distribution.

Referring to FIG. 10B, the method of manufacturing an EUV mask in some example embodiments may be similar to the example in FIG. 10A, but the method in FIG. 10B may further include performing proximity effect correction (PEC) on the mask data (S535) after the mask data preparation (S530). The PEC may refer to a process of correcting an error by an electron beam proximity effect, by scattering of an electron beam. Specifically, in the electron beam exposure process, as a high acceleration voltage used to generate an electron beam adds high kinetic energy to electrons, a resist and atoms of a material disposed therebelow may also be scattered together, and the phenomenon may be called an electron beam proximity effect. The electron beam proximity effect may be modeled with two Gaussian functions or an empirically determined proximity function, and correction for the electron beam proximity effect may be enabled based on the functions.

A commonly used proximity effect correction to correct an error caused by the electron beam proximity effect may be a method of compensating for a dose changed by scattering by changing a dose during an actual exposure. For example, a relatively low dose may be allocated to a region having a high pattern density, and a relatively high dose may be allocated to isolated and relatively small shapes. The dose may include an irradiation amount of the electron beam. The correction of the proximity effect may include a method of modifying a corner of the pattern shape or changing a size of the pattern shape.

After the PEC is performed, an EUV mask may be manufactured by performing a mask substrate exposure process (S400) and an EUV mask formation process (S550).

Figure 11:
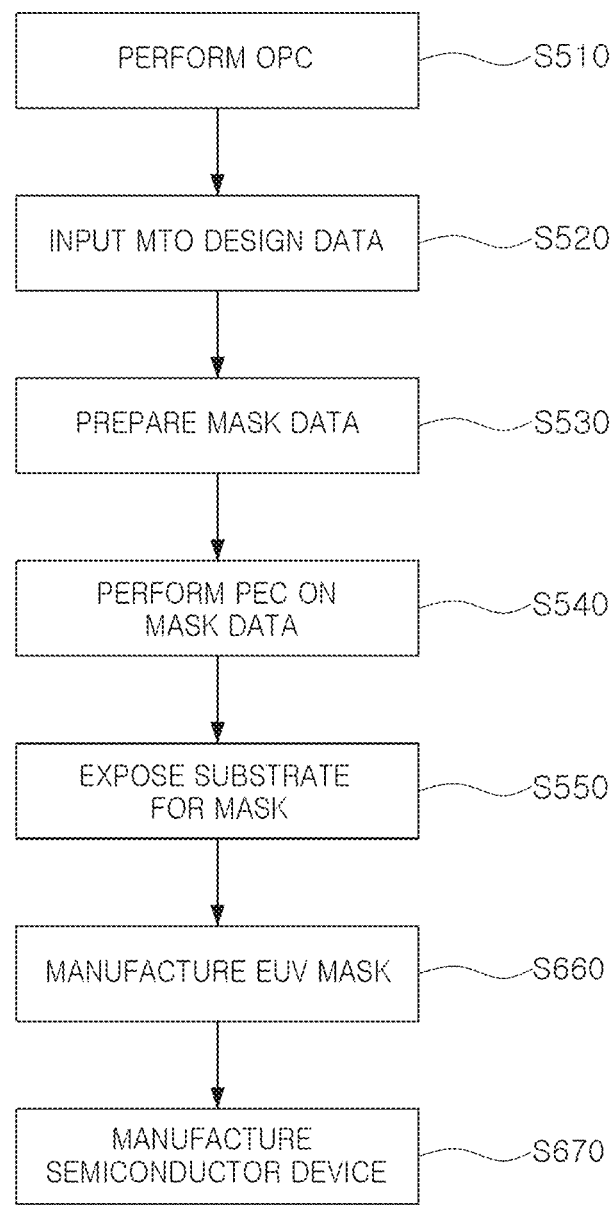
FIG. 11 is a flowchart illustrating a method of manufacturing a semiconductor device according to some example embodiments of the present inventive concepts.

FIG. 11 is a flowchart illustrating a method of manufacturing a semiconductor device according to some example embodiments. Referring to FIG. 11, by forming an EUV mask (S660) by going through a series of processes S510 to S550 as in FIG. 10B, an EUV mask may be manufactured. When the EUV mask is manufactured, by performing various semiconductor processes on a semiconductor substrate such as a wafer using the manufactured EUV mask (S670), a semiconductor device may be manufactured. A process using an EUV mask may generally include a patterning process through an EUV exposure process. A desired pattern may be formed on a semiconductor substrate or a material layer through a patterning process using the EUV mask.

The semiconductor process may include a deposition process, an etching process, an ion process, a cleaning process, and the like. The deposition process may include various material layer formation processes such as CVD, sputtering, and spin coating. The ion process may include processes such as ion implantation, diffusion, and heat treatment. The semiconductor process may include a packaging process in which a semiconductor device is mounted on a PCB and is encapsulated with an encapsulant, or a test process in which a semiconductor device or a package is tested may be included in the semiconductor process.

A method of manufacturing a semiconductor device in some example embodiments may use a method of manufacturing an EUV mask including the PEC process in FIG. 10B. However, some example embodiments thereof are not limited thereto. The method of manufacturing a semiconductor device in some example embodiments may use the method of manufacturing a mask in FIG. 10A.

Figure 12A:
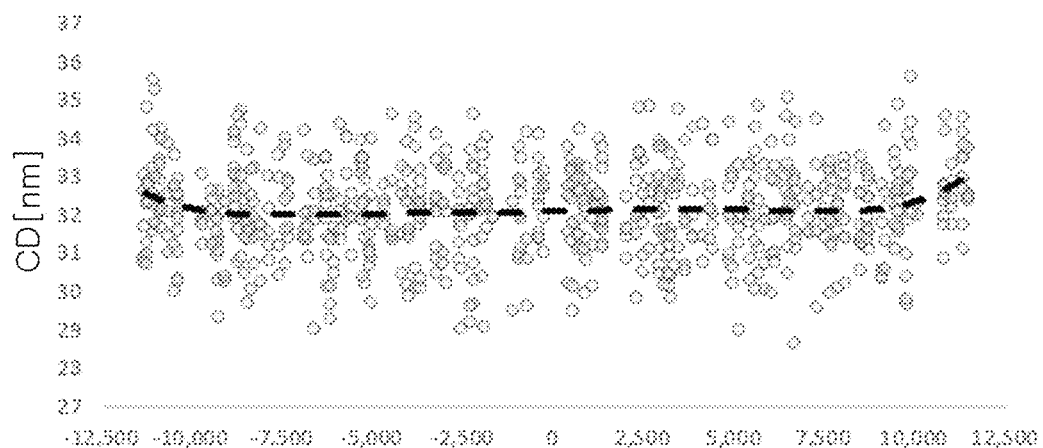
FIGS. 12A and 12B are diagrams illustrating a result of applying an OPC method according to some example embodiments of the present inventive concepts.
Figure 12B:
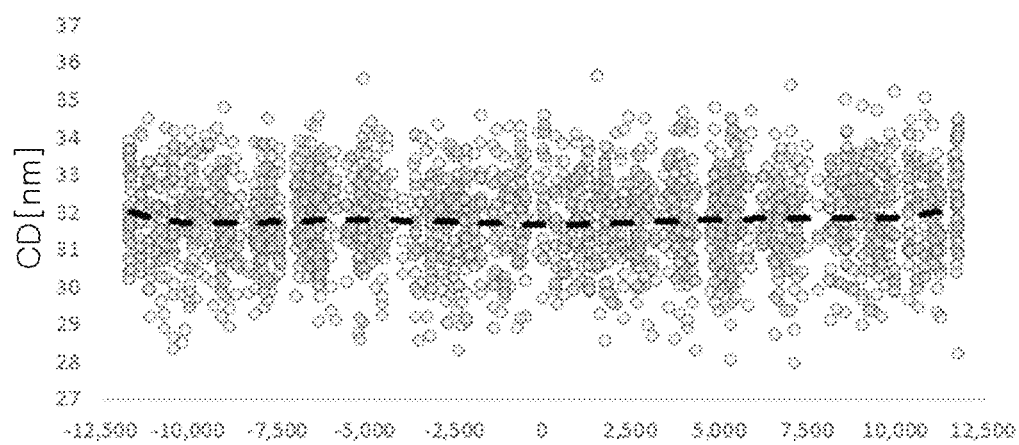

FIGS. 12A and 12B are diagrams illustrating a result of applying an OPC method according to some example embodiments. FIG. 12A illustrates an example in which no OPC correction is performed, and FIG. 12 illustrates an example in which the OPC correction is performed. The distribution may improve according to the OPC correction in some example embodiments.

Figure 13:
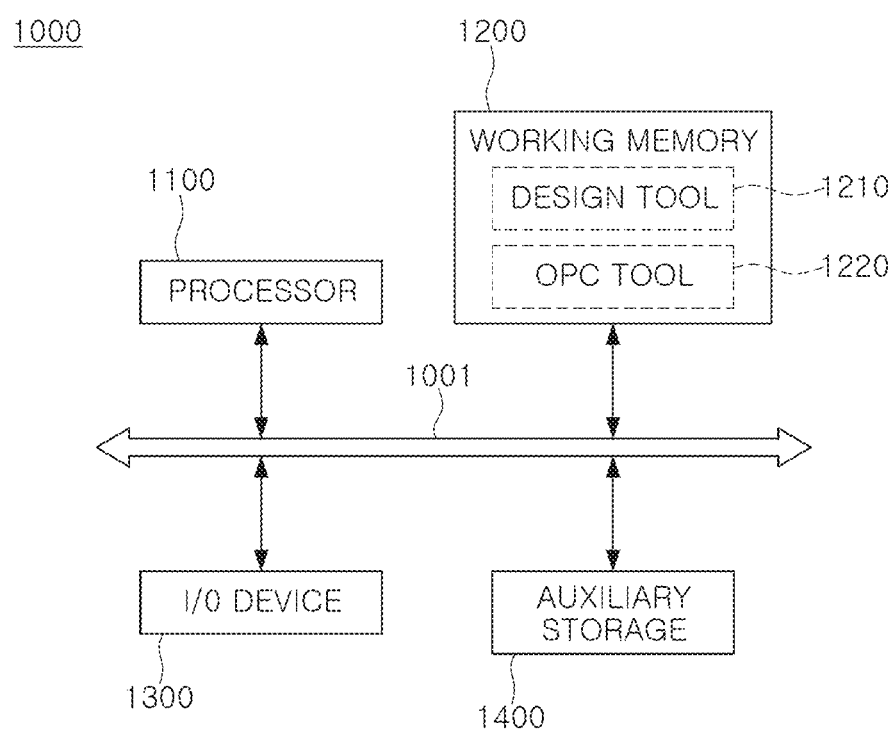
FIG. 13 is a block diagram illustrating a computing system 1000 according to some example embodiments of the present inventive concepts.

FIG. 13 is a block diagram illustrating a computing system 1000 according to some example embodiments. Referring to FIG. 13, the computing system 1000 may include a processor 1100 connected to a system bus 1001, a working memory 1200, an input and output device 1300, and an auxiliary storage device 1400. For example, the computing system 1000 may be implemented as a dedicated device for the method of generating/correcting the OPC model described in FIGS. 1 to 12, or may be provided as a dedicated device for performing semiconductor designing including the same. For example, the computing system 1000 may include various designs and verification simulation programs.

The processor 1100, the working memory 1200, the input and output device 1300, and the auxiliary storage device 1400 may be electrically connected to each other and may exchange data with each other through the system bus 1001. However, the configuration of the system bus 1001 is not limited to the above example embodiments, and may further include arbitration means for efficient management.

The processor 1100 may be implemented to execute software (an application program, an operating system, a device driver) to be executed in the computing system 1000. The processor 1100 may execute an operating system loaded into the working memory 1200. The processor 1100 may execute various application programs to be driven based on an operating system. For example, the processor 1100 may be implemented by a central processing unit (CPU), a microprocessor, an application processor (AP), or a processing device similar to the above-mentioned processors.

The working memory 1200 may be loaded with an operating system or application programs. When the computing system 1000 is booted, an OS image stored in the auxiliary storage device 1400 may be loaded into the working memory 1200 in booting sequence. Various input and output operations of the computing system 1000 may be supported by the operating system. Similarly, application programs may be loaded to the working memory 1200 to be selected by a user or to provide services. Also, as described above, a design tool 1210 for semiconductor design and/or an OPC tool 1220 for a layout pattern division method and an optical proximity correction method may be loaded from the auxiliary storage device 1400 to the working memory 1200.

The design tool 1210 may have a bias function for changing a shape and a position of specific layout patterns differently from those defined by design rules. Also, the design tool 1210 may perform a design rule check (DRC) under the changed bias data condition. For example, the working memory 1200 may be implemented by a volatile memory such as a dynamic random access memory (DRAM) or a static random access memory (SRAM) or a flash memory, a phase change random access memory (PRAM), a resistance random access memory (RRAM), a nano-floating gate memory (NFGM), a polymer random access memory (PoRAM), a magnetic random access memory (MRAM), a ferroelectric random access memory (FRAM), and the like.

The input and output device 1300 may control user input and output from user interface devices. For example, the input and output device 1300 may include input means such as a keyboard, a keypad, a mouse, and a touch screen, and may receive information from a designer. A designer may receive information on a semiconductor region or data paths requiring adjusted operating properties using the input and output device 1300. Also, the input and output device 1300 may include an output means such as a printer or a display and may display a process of processing of the design tool 1210 and/or the OPC tool 2220, and a result thereof.

The auxiliary storage device 1400 may be provided as a storage medium of the computing system 1000. The auxiliary storage device 1400 may store application programs, OS images, and various data. The auxiliary storage device 1400 may be provided in the form of a large-capacity storage device such as a memory card (MMC, eMMC, SD, micro SD, or the like.), a hard disk drive (HDD), a solid state drive (SSD), and a universal flash storage (UFS).

In some example embodiments, some or all of the computing system 1000 (including without limitation the processor 1100, working memory 1200, auxiliary storage 1400, design tool 1210, OPC tool 1220, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), an application processor (AP), a microcomputer, a field programmable gate array (FPGA), and programmable logic unit, a microprocessor, application-specific integrated circuit (ASIC), a neural network processing unit (NPU), an Electronic Control Unit (ECU), and the like. In some example embodiments, the processing circuitry may include a non-transitory computer readable storage device (which may be the working memory 1200 and/or auxiliary storage 1400), for example a solid state drive (SSD), storing a program of instructions, and a processor (e.g., processor 1100, which may be a CPU) configured to execute the program of instructions to implement the functionality of any of the elements of the computing system 1000 and/or elements thereof as described herein (including without limitation some or all of the design tool 1210 and/or the OPC tool 1220). With will further be understood that the processing circuitry of computing system 1000 may be configured to implement any of the methods according to any of the example embodiments, including any of the methods illustrated in any of the drawings, for example based on processor 1100 executing a program of instructions stored at the working memory 1200.

A stack-type memory device may be implemented using the OPC method and the method of manufacturing a mask described in the aforementioned example embodiments.

Figure 14:
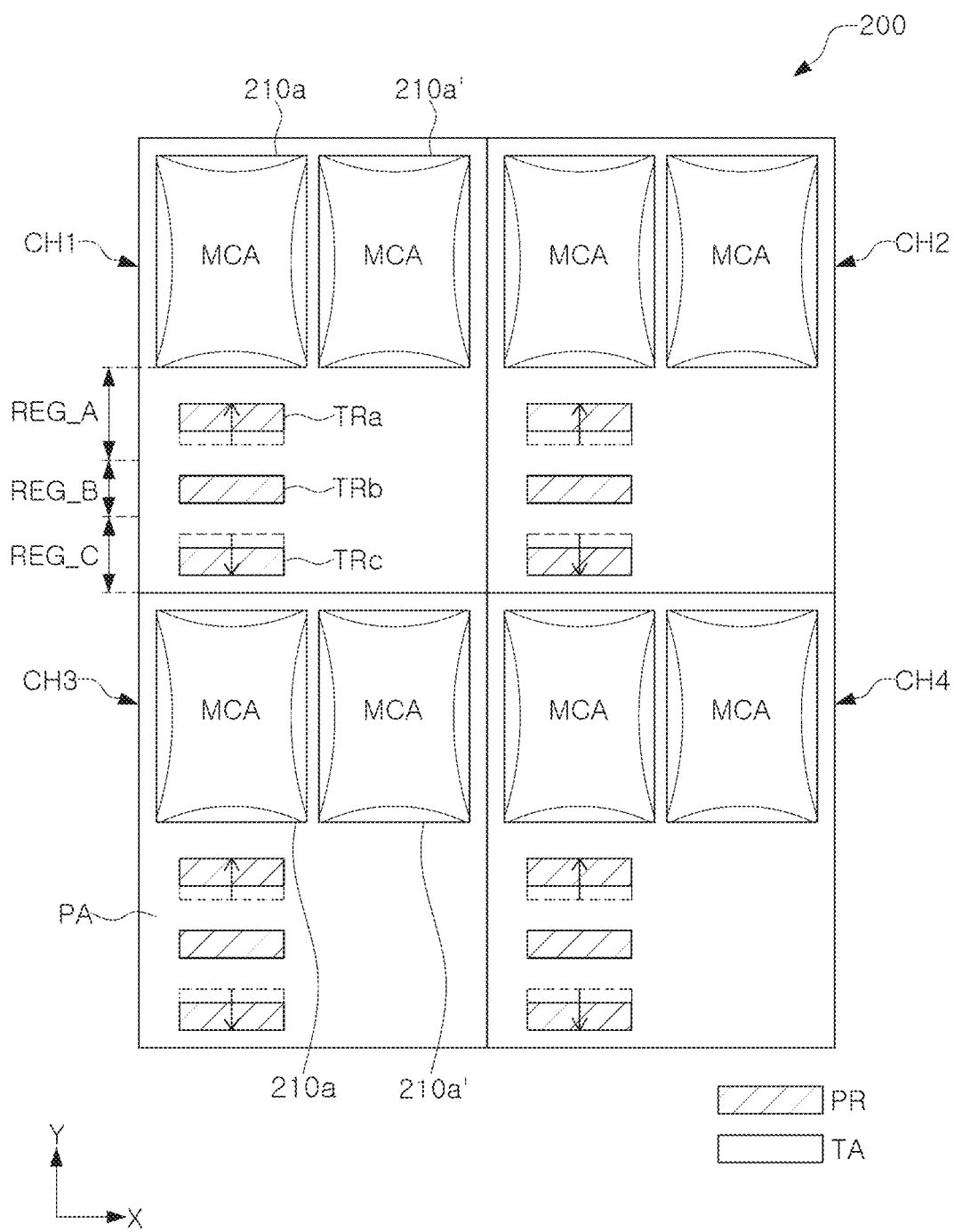
FIG. 14 is a diagram illustrating a layout 200 of a stack-type memory device according to some example embodiments of the present inventive concepts.

FIG. 14 is a diagram illustrating a layout 200 of a stack-type memory device according to some example embodiments. Referring to FIG. 14, the layout 200 may include a plurality of semiconductor chips CH1 to CH4 adjacent to each other, and a stack-type memory device may be implemented in each of the semiconductor chips CH1 to CH4. The first and second semiconductor chips CH1 and CH2 may be adjacent to each other in the X direction, and the third and fourth semiconductor chips CH3 and CH4 may be adjacent to each other in the X direction. Further, the first and third semiconductor chips CH1 and CH3 may be adjacent to each other in the Y direction, and the second and fourth semiconductor chips CH2 and CH4 may be adjacent to each other in the Y direction.

The first semiconductor chip CH1 may include memory cell array areas (MCA) 210a and 210a' and a peripheral circuit area PA. The peripheral circuit area PA may be adjacent to the memory cell array areas 210a and 210a' in a first direction. In some example embodiments, the first direction may be the Y direction. However, some example embodiments thereof are not limited thereto. The peripheral circuit area PA may be adjacent to the memory cell array areas 210a and 210a' in the X direction. The peripheral circuit area PA may be divided into a plurality of regions depending on a position. In some example embodiments, the peripheral circuit area PA may be divided into first to third regions REG_A, REG_B, and REG_C in the Y direction. Various first to third elements TRa, TRb, TRc, which may be one or more of a row decoder, a page buffer, a latch circuit, a cache circuit, a column decoder, a sense amplifier, or a data input and output circuit may be disposed in the first to third regions REG_A, REG_B, and REG_C, respectively, in the peripheral circuit area PA. The first to third elements TRa to TRc may include a pad PR (e.g., 2305 as described with reference to FIG. 15) exposed from an outer insulating substrate TA (e.g., 2301 as described with reference to FIG. 15). The second to fourth semiconductor chips CH2 to CH4 may be implemented the same or substantially the same as the first semiconductor chip CH1.

The memory cell array areas 210a and 210a' may be defined as an active region in which the memory cell array is disposed. The first semiconductor chip CH1 may include two memory cell array areas 210a and 210a', but some example embodiments thereof are not limited thereto. The number of memory cell array areas included in the first semiconductor chip CH1 may be varied.

A chip to chip (C2C) structure may be implemented using the OPC method and the method of manufacturing a mask described in the aforementioned example embodiments.

Figure 15:
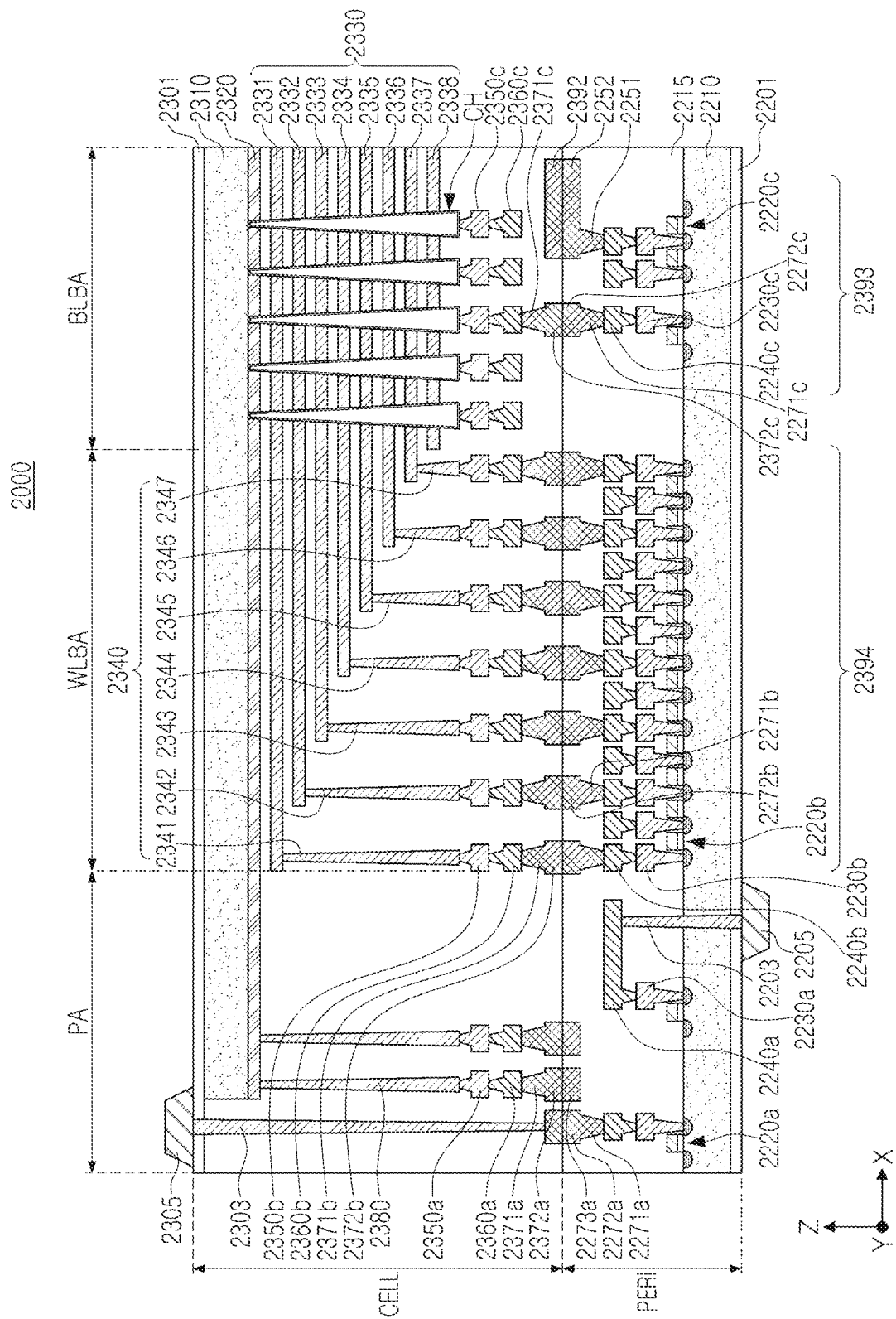
FIG. 15 is a diagram illustrating a non-volatile memory device 2000 implemented in a C2C structure according to some example embodiments of the present inventive concepts.

FIG. 15 is a diagram illustrating a non-volatile memory device 2000 implemented in a C2C structure according to some example embodiments. As shown, the diagram of FIG. 15 may be a cross-sectional view along cross-sectional view line XV-XV' of FIG. 14. In the C2C structure, an upper chip including a cell area CELL may be manufactured on a first wafer, a lower chip including a peripheral circuit area PERI may be manufactured on a second wafer different from the first wafer, and the upper chip and the lower chip may be connected to each other by a bonding method. For example, the bonding method may be implemented by a method of electrically connecting a bonding metal formed on an uppermost metal layer of the upper chip to a bonding metal formed on an uppermost metal layer of the lower chip. In some example embodiments, when the bonding metal is formed of copper (Cu), the bonding method may be a Cu-to-Cu bonding method. In some example embodiments, the bonding metal may be formed of aluminum (Al) or tungsten (W).

Each of the peripheral circuit area PERI and the cell area CELL of the non-volatile memory device 2000 may include an external pad bonding area PA, a word line bonding area WLBA, and a bit line bonding area BLBA.

The peripheral circuit area PERI may include a first substrate 2210, an interlayer insulating layer 2215, a plurality of circuit devices 2220a, 2220b, 2220c formed on the first substrate 2210, and first metal layers 2230a, 2230b, and 2230c connected to the plurality of circuit devices 2220a, 2220b, and 2220c, and second metal layers 2240a, 2240b, and 2240c formed on the first metal layers 2230a, 2230b, and 2230c. In some example embodiments, the first metal layers 2230a, 2230b, and 2230c may be formed of tungsten having a relatively high specific resistance. In some example embodiments, the second metal layers 2240a, 2240b, and 2240c may be formed of copper having relatively low resistivity.

FIG. 15 illustrates the first metal layers 2230a, 2230b, and 2230c and the second metal layers 2240a, 2240b, and 2240c, but some example embodiments thereof are not limited thereto. At least one metal layer may be further formed on the second metal layers 2240a, 2240b, and 2240c. At least a portion of the one or more metal layer formed on the second metal layers 2240a, 2240b, and 2240c may be formed of aluminum having resistivity different from that of copper forming the second metal layers 2240a, 2240b, and 2240c.

In some example embodiments, an interlayer insulating layer 2215 may be disposed on the first substrate 2210 to cover the plurality of circuit devices 2220a, 2220b, and 2220c, the first metal layers 2230a, 2230b, and 2230c, and the second metal layers 2240a, 2240b, and 2240c. In some example embodiments, the interlayer insulating layer 2215 may include an insulating material such as silicon oxide or silicon nitride.

Lower bonding metals 2271b and 2272b may be formed on the second metal layer 2240b of a word line bonding area WLBA. In the word line bonding area WLBA, the lower bonding metals 2271b and 2272b of the peripheral circuit area PERI may be electrically connected to the upper bonding metals 2371b and 2372b of the cell area CELL by a bonding method. In some example embodiments, the lower bonding metals 2271b and 2272b and the upper bonding metals 2371b and 2372b may be formed of aluminum, copper, or tungsten. Also, the upper bonding metals 2371b and 2372b of the cell area CELL may be referred to as first metal pads, and the lower bonding metals 2271b and 2272b may be referred to as second metal pads.

The cell area CELL may include at least one memory block. In some example embodiments, the cell area CELL may include the second substrate 2310 and the common source line 2320. On the second substrate 2310, a plurality of word lines 2331 to 2338 (2330) may be stacked in a direction (Z-axis direction) perpendicular to an upper surface of the second substrate 2310. In some example embodiments, string select lines and ground select lines may be disposed on each of upper and lower portions of the word lines 2330. In some example embodiments, a plurality of word lines 2330 may be disposed between the string select lines and the ground select line.

In the bit line bonding area BLBA, the channel structure CH may extend in a direction (Z-axis direction) perpendicular to an upper surface of the second substrate 2310 and may penetrate the word lines 2330, the string select lines, and ground select lines. The channel structure CH may include a data storage layer, a channel layer, and a buried insulating layer, and the channel layer may be electrically connected to the first metal layer 2350c and the second metal layer 2360c. For example, the first metal layer 2350c may be a bit line contact, and the second metal layer 2360c may be a bit line. In some example embodiments, the bit line 2360c may extend in the first direction (Y-axis direction) parallel to the upper surface of the second substrate 2310.

As illustrated in FIG. 15, an area in which the channel structure CH and the bit line 2360c are disposed may be defined as the bit line bonding area BLBA. In some example embodiments, the bit line 2360c may be electrically connected to the circuit devices 2220c providing the page buffer 2393 in the peripheral circuit area PERI in the bit line bonding area BLBA. For example, the bit line 2360c may be connected to the upper bonding metals 2371c and 2372c in the peripheral circuit area PERI. The upper bonding metals 2371c and 2372c may be connected to the lower bonding metals 2271c and 2272c connected to the circuit devices 2220c of the page buffer 2393. In the word line bonding area WLBA, the word lines 2330 may extend in a second direction (X-axis direction) perpendicular to the first direction and parallel to the upper surface of the second substrate 2310. In some example embodiments, the word line bonding area WLBA may be connected to a plurality of cell contact plugs 2341 to 2347 (2340). For example, the word lines 2330 and the cell contact plugs 2340 may be connected to each other in pads provided by at least a portion of the word lines 2330 extending by different lengths in the second direction. In some example embodiments, the first metal layer 2350b and the second metal layer 2360b may be connected in order to an upper portion of the cell contact plugs 2340 connected to the word lines 2330. In some example embodiments, the cell contact plugs 2340 may be connected to the peripheral circuit area PERI through the upper bonding metals 2371b and 2372b of the cell area CELL and the lower bonding metals 2271b and 2272b of the peripheral circuit area PERI in the word line bonding area WLBA. In some example embodiments, bonding metals 2251 and 2252 of the peripheral circuit area PERI may be connected to the cell area CELL through the bonding metal 2392 of the cell area CELL.

In some example embodiments, the cell contact plugs 2340 may be electrically connected to the circuit devices 2220b providing the row decoder 2394 in the peripheral circuit area PERI. In some example embodiments, operating voltages of the circuit devices 2220b providing the row decoder 2394 may be different from operating voltages of the circuit devices 2220c providing the page buffer 2393. For example, the operating voltages of the circuit devices 2220c providing the page buffer 2393 may be greater than the operating voltages of the circuit devices 2220b providing the row decoder 2394.

A common source line contact plug 2380 may be disposed in the external pad bonding area PA. In some example embodiments, the common source line contact plug 2380 may be formed of a conductive material such as a metal, a metal compound, or polysilicon. The common source line contact plug 2380 may be electrically connected to the common source line 2320. A first metal layer 2350a and a second metal layer 2360a may be stacked in order on the common source line contact plug 2380. For example, an area in which the common source line contact plug 2380, the first metal layer 2350a, and the second metal layer 2360a are disposed may be defined as the external pad bonding area PA. The second metal layer 2360a may be electrically connected to the upper metal via 2371a. The upper metal via 2371a may be electrically connected to the upper metal pattern 2372a.

The input and output pads 2205 and 2305 may be disposed in the external pad bonding area PA. Referring to FIG. 15, a lower insulating layer 2201 covering a lower surface of the first substrate 2210 may be formed below the first substrate 2210. Also, a first input and output pad 2205 may be formed on the lower insulating layer 2201. In some example embodiments, the first input and output pad 2205 may be connected to at least one of the plurality of circuit devices 2220a, 2220b, or 2220c disposed in the peripheral circuit area PERI through the first input and output contact plug 2203. In some example embodiments, the first input and output pad 2205 may be isolated from the first substrate 2210 by the lower insulating layer 2201. Also, a side-surface insulating layer may be disposed between the first input and output contact plug 2203 and the first substrate 2210, such that the first input and output contact plug 2203 and the first substrate 2210 may be electrically isolated from each other.

Referring to FIG. 15, an upper insulating layer 2301 covering an upper surface of the second substrate 2310 may be formed on the second substrate 2310. Also, a second input and output pad 2305 may be disposed on the upper insulating layer 2301. In some example embodiments, the second input and output pad 2305 may be connected to at least one of the plurality of circuit devices 2220a, 2220b, or 2220c disposed in the peripheral circuit area PERI through the second input and output contact plug 2303, the lower metal pattern 2272a, and the lower metal via 2271a.

In some example embodiments, the second substrate 2310 and the common source line 2320 may not be disposed in the area in which the second input and output contact plug 2303 is disposed. Also, the second input and output pad 2305 may not overlap the word lines 2330 in the third direction (Z-axis direction). Referring to FIG. 15, the second input and output contact plug 2303 may be isolated from the second substrate 2310 in a direction parallel to the upper surface of the second substrate 2310. Also, the second input and output contact plug 2303 may penetrate the interlayer insulating layer 2315 of the cell area CELL and may be connected to the second input and output pad 2305. In some example embodiments, the second input and output pad 2305 may be electrically connected to the circuit device 2220a.

In some example embodiments, the first input and output pad 2205 and the second input and output pad 2305 may be selectively formed. For example, the non-volatile memory device 2000 may include only the first input and output pad 2205 disposed on the first substrate 2210 or the second input and output pad 2305 disposed on the second substrate 2310. In some example embodiments, the non-volatile memory device 2000 may include both the first input and output pad 2205 and the second input and output pad 2305.

In each of the outer pad bonding area PA and the bit line bonding area BLBA included in the cell area CELL and the peripheral circuit area PERI, the metal pattern of the uppermost metal layer may be present as a dummy pattern, or an uppermost metal layer may be empty.

In the non-volatile memory device 2000 in some example embodiments, in the outer pad bonding area PA, a lower metal pattern 2273a having the same shape as that of the upper metal pattern 2372a of the cell area CELL may be formed on the uppermost metal layer of the peripheral circuit area PERI to correspond to the upper metal pattern 2372a formed on the uppermost metal layer of the cell area CELL in the external pad bonding area PA. The lower metal pattern 2273a formed on the uppermost metal layer of the peripheral circuit area PERI may not be connected to a contact in the peripheral circuit area PERI. Similarly, an upper metal pattern having the same shape as that of the lower metal pattern of the peripheral circuit area PERI may be formed on the upper metal layer of the cell area CELL to correspond to the lower metal pattern formed on the uppermost metal layer of the peripheral circuit area PERI in the external pad bonding area PA.

The lithography system in some example embodiments may directly correct a transmittance value of EUV illumination system apodization for each slit.

The EUV OPC model generation method in some example embodiments may include additionally correcting CD data for each slit position through correction of the apodization table.

The EUV OPC model generation method in some example embodiments may include, when the CD trend for each slit position for facility is changed, correcting only the CD trend for each slit position using an existing model and regenerating the model.

As for the EUV OPC, differently from the DUV OPC, the CD difference may occur depending on a position of the slit in a shot even in the same pattern by the shadowing effect (since non-telecentric illumination is incident to a curved slit, a CD difference may occur depending on a position of the slit), and accordingly, distribution may deteriorate in terms of in-field-uniformity. A general OPC model may have CD predictive power for each slit by adding CD data for each slit during model calibration. However, the phenomenon in which tendency of the CD for each slit of the CD data applied to the OPC model generation may be different from tendency of the CD for each slit of the CD data in performing an actual process may occur such that a coverage of the OPC model may not be satisfied.

In some example embodiments, a model for predicting the CD data for each slit position may be used by a method of pre-generating a model which may predict CD data with reference to a slit center in the OPC model, rather than using the method of calibrating including the CD data for each slit with reference to a slit center, applying a table representing intensity for each position of the slit which may actually occur in a wafer, and correcting each intensity for each slit position through the table.

According to the aforementioned example embodiments, as for the optical proximity correction method and the mask manufacturing method of the lithography system, by controlling the intensity values of apodization for each slit position, distribution may improve.

While some example embodiments have been illustrated and described above, it will be apparent to those skilled in the art that modifications and variations could be made without departing from the scope of the present inventive concepts as defined by the appended claims.

What is claimed is:

1. An optical proximity correction method of a lithography system, the method comprising:
    dividing a transmission cross coefficient (TCC) for each slit region of a slit;
    generating an optical proximity correction (OPC) model to which the divided TCC is applied and to which an apodization value for each slit position is applied separately from the divided TCC;
    measuring an updated apodization value for each slit position;
    fitting critical dimension (CD) data for each slit position to a simulation CD of the OPC model using the measured updated apodization value for each slit position; and
    correcting the OPC model using the fitted CD data.

2. The method of claim 1, wherein the dividing the TCC for each slit region includes dividing the TCC using at least one of an aberration, a phase, an intensity, a polarity, or a separate apodization value according to coordinates of the slit.

3. The method of claim 1, further comprising:
    obtaining CD data of a same pattern for each slit position of the slit.

4. The method of claim 1, wherein the measuring the updated apodization value includes measuring a particular apodization value of a light source for each slit position of a plurality of slits.

5. The method of claim 4, wherein
    each slit of the plurality of slits is implemented in an arc shape, and
    a number of slit positions of each slit of the plurality of slits is 13.

6. The method of claim 1, wherein the fitting CD data includes fitting the CD data for each slit position and simulation CD data of the OPC model by correcting an intensity value of an apodization table.

7. The method of claim 1, wherein the fitting CD data includes scaling the measured updated apodization value in a form of a two-dimensional function.

8. The method of claim 7, wherein the fitting CD data includes checking simulation CD data according to a change of the measured updated apodization value for each slit position.

9. The method of claim 8, wherein the fitting CD data includes selecting a changed updated apodization value having a same trend value as that of a measured CD data of a wafer.

10. The method of claim 1, wherein the fitting CD data includes:
    correcting an intensity value of apodization for each slit position; and
    fitting the CD data while the intensity value of apodization is corrected.

11. A mask manufacturing method of a lithography system, the method comprising:
    measuring critical dimension (CD) data for each slit position from a wafer;
    determining whether a CD trend for each slit position passes a verification;
    correcting the CD data for each slit position in response to a determination that the CD trend for each slit position fails to pass the verification;
    regenerating an optical proximity correction (OPC) model including apodization values for each slit position using the corrected CD data; and
    determining whether to remanufacture a mask using the regenerated OPC model.

12. The method of claim 11, further comprising:
    performing scaling in a form of a quadratic function from the measured CD data.

13. The method of claim 12, further comprising:
    checking simulation CD data according to a change of an apodization value for each slit position.

14. The method of claim 13, further comprising:
    selecting an apodization value having a same trend value as an apodization value of the measured CD data as a result of checking the simulation CD data.

15. The method of claim 11, wherein an intensity value of apodization for each slit position is implemented in a form of a table.

16. An optical proximity correction method of a lithography system, the method comprising:
    generating an optical proximity correction (OPC) model to which a divided transmission cross coefficient (TCC) for each region of a slit position is applied and to which an apodization value for each slit position is applied separately from the divided TCC;
    calibrating the generated OPC model;
    performing a first verification of the generated OPC model using an OPC verification model;
    fitting critical dimension (CD) data for each slit position in response to a determination that the first verification fails; and
    performing a second verification using the OPC verification model in response to performing the fitting CD data.

17. The method of claim 16, further comprising:
measuring apodization values for each slit position with respect to a wafer.

18. The method of claim 17, further comprising:
generating a trend function in a form of a quadratic function using the measured apodization values.

19. The method of claim 18, further comprising:
scaling the apodization values for each slit position with a two-dimensional function.

20. The method of claim 16, wherein the fitting CD data for each slit position includes:
CD-scaling for each slit position to establish scaled simulation CD data; and
fitting the scaled simulation CD data to CD data of a wafer.

* * * * *